United States Patent
Meirosu et al.

(10) Patent No.: US 11,296,929 B2
(45) Date of Patent: Apr. 5, 2022

(54) METHODS AND NETWORK SYSTEMS FOR ENABLING A NETWORK SERVICE IN A VISITED NETWORK

(71) Applicant: Telefonaktiebolaget LM Ericsson (publ), Stockholm (SE)

(72) Inventors: Catalin Meirosu, Sollentuna (SE); Staffan Blau, Spånga (SE); Marian Darula, Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 2 days.

(21) Appl. No.: 16/978,433

(22) PCT Filed: Mar. 8, 2018

(86) PCT No.: PCT/SE2018/050222
§ 371 (c)(1),
(2) Date: Sep. 4, 2020

(87) PCT Pub. No.: WO2019/172812
PCT Pub. Date: Sep. 12, 2019

(65) Prior Publication Data
US 2021/0051059 A1    Feb. 18, 2021

(51) Int. Cl.
*G06F 15/173*    (2006.01)
*H04L 41/08*    (2022.01)
(Continued)

(52) U.S. Cl.
CPC ............ *H04L 41/08* (2013.01); *H04L 41/022* (2013.01); *H04L 41/0806* (2013.01); *H04L 41/5051* (2013.01)

(58) Field of Classification Search
CPC ... H04L 41/08; H04L 41/022; H04L 41/0806; H04L 41/5051
See application file for complete search history.

(56) References Cited

U.S. PATENT DOCUMENTS

2016/0360408 A1* 12/2016 Senarath ................. H04W 8/20
2019/0174466 A1*  6/2019 Zhang .................... H04L 5/0048
(Continued)

FOREIGN PATENT DOCUMENTS

| EP | 2 940 582 A1 | 11/2015 | |
|----|--------------|---------|---|
| WO | 2017144096 A1 | 8/2017 | |
| WO | WO-2019120524 A1 * | 6/2019 | ............. H04L 41/12 |

OTHER PUBLICATIONS

International Search Report and Written Opinion issued in international Application No. PCT/SE2018/050222 dated Sep. 14, 2018 (16 pages).

(Continued)

*Primary Examiner* — Richard G Keehn
(74) *Attorney, Agent, or Firm* — Rothwell, Figg, Ernst & Manbeck, P.C.

(57) ABSTRACT

Methods and network systems for enabling a network service for a client belonging to a home network (200) by using at least one Virtual Network Function, VNF (202D) of a Virtualized Infrastructure (202C) in a visited network (202). When requested by the home network, the visited network instantiates (2:10), a nested Virtualized Infrastructure Manager, VIM, (202E) which previously has been onboarded in the visited network and has been selected from a set of predefined VIMs supported by the home network. The visited network also instantiates (2:10) in the nested VIM a VNF package which has been onboarded in the visited network and having software needed to execute the network service. The network service can then be employed using the instantiated VIM and VNF package.

23 Claims, 6 Drawing Sheets

(51) Int. Cl.
  *H04L 41/5051* (2022.01)
  *H04L 41/0806* (2022.01)
  *H04L 41/022* (2022.01)

(56) References Cited

U.S. PATENT DOCUMENTS

2019/0238425 A1* 8/2019 Mladin .............. H04L 41/0806
2021/0051059 A1* 2/2021 Meirosu ............. H04L 41/0806
2021/0266192 A1* 8/2021 Pognant ............. H04L 41/0806

OTHER PUBLICATIONS

INTEL, "NRM enhancements to support VNF lifecycle management", 3GPP TSG SA WG5 (Telecom Managememt) Meeting #102, S5-154152, Beijing, China, Aug. 24-28, 2015 (4 pages).

ETSI GR NFV IFA 028 V0.11.0 (Sep. 2017), Network Functtion Virtualisation (NFV); Management and Orchestration; Architecture options to support the offering of NFV MANO services across multiple administrative domains, Sep. 2017 (61 pages).

ETSI GR NFV-EVE 012 VO.0.12 (Sep. 2017), Network Functions Virtualisation (NFV); Evolution and Ecosystem; Report on Network Slicing Support with ETSI NFV Architecture Framework, Sep. 2017 (29 pages).

3GPP TR 28.801 V2.0.1 (Sep. 2017), 3rd Generation Partnership Project; Technical Specification Group Services and System Aspects; Telecommunication management; Study on management and orchestration of network slicing for next generation network (Release 15), Sep. 2017 (78 pages).

* cited by examiner

METHODS AND NETWORK SYSTEMS FOR ENABLING A NETWORK SERVICE IN A VISITED NETWORK

CROSS REFERENCE TO RELATED APPLICATION(S)

This application is a 35 U.S.C. § 371 National Stage of International Patent Application No. PCT/SE2018/050222, filed Mar. 8, 2018, designating the United States.

TECHNICAL FIELD

The present disclosure relates generally to a client's home network, a visited network, and methods therein, for enabling a network service to be employed for the client in the visited network using at least one Virtual Network Function, VNF, of a Virtualized Infrastructure in the visited network.

BACKGROUND

Recently, solutions have been developed for enabling network services to be executed by means of computing, storing and networking resources in a virtualized infrastructure in a communication network. This can be done by creating and using Virtual Network Functions, VNFs in the virtualized infrastructure. This concept is generally referred to as "Network Functions Virtualization", NFV. It can be said that the virtualized infrastructure is comprised of resources in a cloud-like environment such as large data centers or the like, and such resources are sometimes referred to as cloud resources.

FIG. 1 illustrates schematically a proposed arrangement for NFV involving components 100A-C of a system for management and orchestration of VNFs 102A, generally denoted "NFV-MANO" 100 which is a commonly used term in the field of virtualization. The VNFs 102A are created from (cloud) resources in a virtualized infrastructure (NFVI) 102 so as to enable and provide various network services for clients, such as streaming, downloading and notification services. The term "resources" is used herein for short to represent any computing, storing and networking resources in a virtualized infrastructure.

The components 100A-C of the NFV-MANO 100 include an NFV Orchestrator (NFVO) 100A which is operative to communicate with an Operation Support System and/or a Business Support System (OSS/BSS) of a communication network. The NFV-MANO 100 also includes a VNF Manager (VNFM) 100B which provides network functionality to the NFVO 100A in order to employ network services. These network functions are created by means of resources in the NFVI 102 as handled and provided by a Virtualized Infrastructure Manager (VIM) 100C of the NFV-MANO 100.

"Federated slice roaming" is a recently developed concept that enables Home Operators to use VNFs in a Visited Operator environment for providing network services to clients in a visited network. Such cooperation between a home network and a visited network typically requires establishment of inter-operator agreements where a large number of service parameters need to be defined.

In this description, the terms home network and visited network chiefly correspond to "home provider" and "visited provider", respectively, and to "home operator" and "visited operator", respectively, which terms are also used herein.

Signaling between 3GPP VNFs in support of slice roaming was defined in the 3GPP document TR28.801 of September 2017. This document covers the interaction of client devices, generally also referred to as User Equipment (UE), and various slice functions that are executed either under the control of the Visited Operator in the visited network or under the control of the Home Operator in the home network. Furthermore, 3GPP TR28.801 describes generic scenarios for defining multi-operator Network Slice Instances.

In the European Telecommunications Standards Institute (ETSI), work is also ongoing as documented in NFV-EVE012 of September 2017 which deals with the management of network slices with the MANO framework in terms of security aspects. Further, "5G Americas" has determined the need for an interface named "Nsl-Ma" between a Network Slice Lifecycle Manager entity and the MANO NFVO.

Furthermore, ETSI defines architectural components and interfaces for "NFVI as a Service" (NFVIaaS) in the document NFV-IFA028 of September 2017. IFA028 also defines a framework for provisioning Network Services between multiple administrative domains, including generic descriptions of interfaces between MANO architectural blocks.

In WO2017/144096 A1, a solution is described for instantiating a federated cloud roaming slice in a visited network when a UE of a home network has cloud roaming functionality enabled.

VNFs are currently being re-designed to be implemented as so-called "cloud native micro services". This will facilitate the instantiation of lower-capacity VNFs where a small amount of clients or users may be supported with relatively limited usage of resources.

In addition, so-called "nested virtualization" has made significant progress recently in terms of reducing the overheads associated with the deployment of the technology in practice. From July 2017, Microsoft Azure is offering nested virtualization as a service based on a hypervisor called "Hyper-V". Google also offers nested virtualization as a service from September 2017. In this description, the term nested virtualization basically refers to the ability of running a virtual machine such as a hypervisor within another virtual machine or hypervisor.

However, it is a problem that when a client of a home network is roaming to a visited network, the establishment of a network service using VNFs in the visited network is quite complex and substantial delays may occur before the service is ready for use. For example, the two networks may use different interfaces and technologies for management of cloud resources which must be coordinated and negotiated in order to control the network services from the home network.

For example, the solution proposed in the above-mentioned WO2017/144096 A1 requires a Virtual Private Network (VPN) connection between the Visited Provider and the Home Provider and that VNFs are created and deployed in the Visited Provider infrastructure upon receiving a service request from a client. The Visited Provider thus needs to immediately deploy VNFs of the Home Provider on their infrastructure, but different clouds are typically built with different technologies or different versions of the same technology, which may not be immediately compatible with such deployments.

Another problem is that it has not been specified how interfaces of the management systems for the deployed VNFs can be established between the home and visited networks. Also, such a deployment is likely to take significant amounts of time due to the distances that various request-response messages need to travel, and large VM images may have to be transferred between the management systems in the respective networks as well.

SUMMARY

It is an object of embodiments described herein to address at least some of the problems and issues outlined above. It is possible to achieve this object and others by using a home network system, a visited network system and methods in the home network and in the visited network, as defined in the attached independent claims.

According to one aspect, a method is performed in a home network of a client, for enabling a network service to be employed for the client in a visited network using at least one Virtual Network Function, VNF of a Virtualized Infrastructure in the visited network. In this method, the home network requests the visited network to instantiate a nested Virtualized Infrastructure Manager, VIM, which has been onboarded in the visited network and selected from a set of predefined VIMs supported by the home network depending on nesting capabilities of the Virtualized Infrastructure in the visited network, the nested VIM being capable of managing resources in the Virtualized Infrastructure.

The home network also requests the visited network to instantiate in the nested VIM a VNF package which has been onboarded in the visited network and having software needed to execute the network service, thereby enabling the network service to be employed using the instantiated VIM and VNF package.

According to another aspect, a home network system of a client is arranged to enable a network service to be employed for the client in a visited network using at least one Virtual Network Function, VNF of a Virtualized Infrastructure in the visited network.

The home network system is configured to request the visited network to instantiate a nested Virtualized Infrastructure Manager, VIM, which has been onboarded in the visited network and selected from a set of predefined VIMs supported by the home network depending on nesting capabilities of the Virtualized Infrastructure in the visited network, the nested VIM being capable of managing resources in the Virtualized Infrastructure.

The home network system is further configured to request the visited network to instantiate in the nested VIM a VNF package which has been onboarded in the visited network and having software needed to execute the network service, thereby enabling the network service to be employed using the instantiated VIM and VNF package.

According to another aspect, a method is performed in a visited network for enabling a network service to be employed in the visited network for a client belonging to a home network, by using at least one Virtual Network Function, VNF of a Virtualized Infrastructure in the visited network. In this method, the visited network instantiates, when requested by the home network, a nested Virtualized Infrastructure Manager, VIM, which has been onboarded in the visited network and is capable of managing resources in the Virtualized Infrastructure, wherein the nested VIM has been selected from a set of predefined VIMs supported by the home network depending on nesting capabilities of the Virtualized Infrastructure in the visited network.

The visited network further instantiates in the nested VIM, when requested by the home network, a VNF package which has been onboarded in the visited network and having software needed to execute the network service, thereby enabling the network service to be employed using the instantiated VIM and VNF package.

According to another aspect, a visited network system is arranged to enable a network service to be employed in the visited network for a client belonging to a home network, by using at least one Virtual Network Function, VNF of a Virtualized Infrastructure in the visited network.

The visited network system is configured to instantiate, when requested by the home network, a nested Virtualized Infrastructure Manager, VIM, which has been onboarded in the visited network and is capable of managing resources in the Virtualized Infrastructure, wherein the nested VIM has been selected from a set of predefined VIMs supported by the home network depending on nesting capabilities of the Virtualized Infrastructure in the visited network.

The visited network system is further configured to instantiate in the nested VIM, when requested by the home network, a VNF package which has been onboarded in the visited network and having software needed to execute the network service, thereby enabling the network service to be employed using the instantiated VIM and VNF package.

The above methods and network systems may be configured and implemented according to different optional embodiments to accomplish further features and benefits, to be described below.

A computer program is also provided comprising instructions which, when executed on at least one computer in either of the home network system and the visited network system, cause the at least one computer to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

In general, a network service can be provided for a client by means of resources in a virtualized infrastructure of a communication network, which requires that a VIM is "onboarded" in the network and also that a VNF package is onboarded in the VIM, so that the VIM can be "instantiated"

and thereby used to employ and control resources in the virtualized infrastructure to provide the network service. Without limitation, a network service in this context may involve streaming or downloading of content to a client's terminal, or some subscription for notifications related to a certain subject or person such as news feeds or the like.

The term "onboard" is commonly used in the field of virtualization which basically means that a workflow is supported which may be done by validating and storing, in a catalogue or the like, static templates of descriptors that describe a VIM or a VNF in terms of deployment and operational behaviour requirements as specified in ETSI GS NFV-MAN 001 V1.1.1.

Further, the term "instantiate" is likewise commonly used in the field of virtualization which basically means that a VIM or a VNF is created as a computer program executed on a processor. This creation process uses onboarded descriptors as well as customization parameters, and also producing an operational record stored in a database to represent the running instance as specified in ETSI GS NFV-MAN 001 V1.1.1.

Briefly described, a solution is provided to expedite and make the process of instantiating a VIM and instantiating a VNF package in the VIM more efficient when providing a network service for client in a visited network. This is accomplished by using a VIM that is supported by the home network and can be created or onboarded in the visited network depending on nesting capabilities of the visited network, and by having performed the onboarding of the VIM and the VNF package in preparation at some point prior to their instantiation, so as to enable rapid instantiation once the service is to be provided to a client. This means that the VIM and the VNF package are already in place and ready for instantiation and usage.

This way, It should be noted that instantiation of the VIM and the VNF package needs to be done every time the network service is requested and needs to be provided, while the onboarding of the VIM and the VNF package only needs to be done once.

Figure 2:
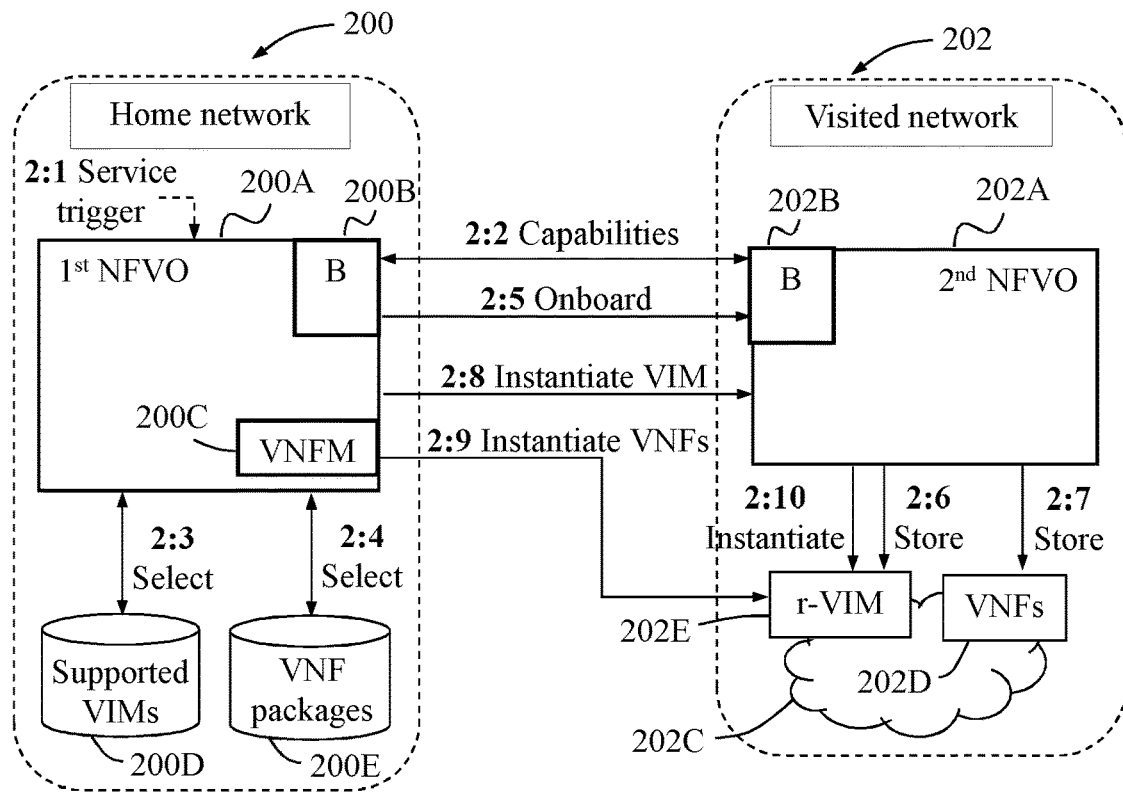
FIG. 2 is a communication scenario illustrating an example of how the solution may be employed, according to some example embodiments.

An example communication scenario where the solution may be employed is illustrated in FIG. 2 involving various entities of a home network 200 herein referred to as a "home network system", and various entities of a visited network 202 herein referred to as a "visited network system", which systems may communicate with each other over one or more suitable communication links. FIG. 2 is described below together with FIGS. 3 and 4 which illustrate procedures in the home network 200 and in the visited network 202, respectively.

Figure 3A:
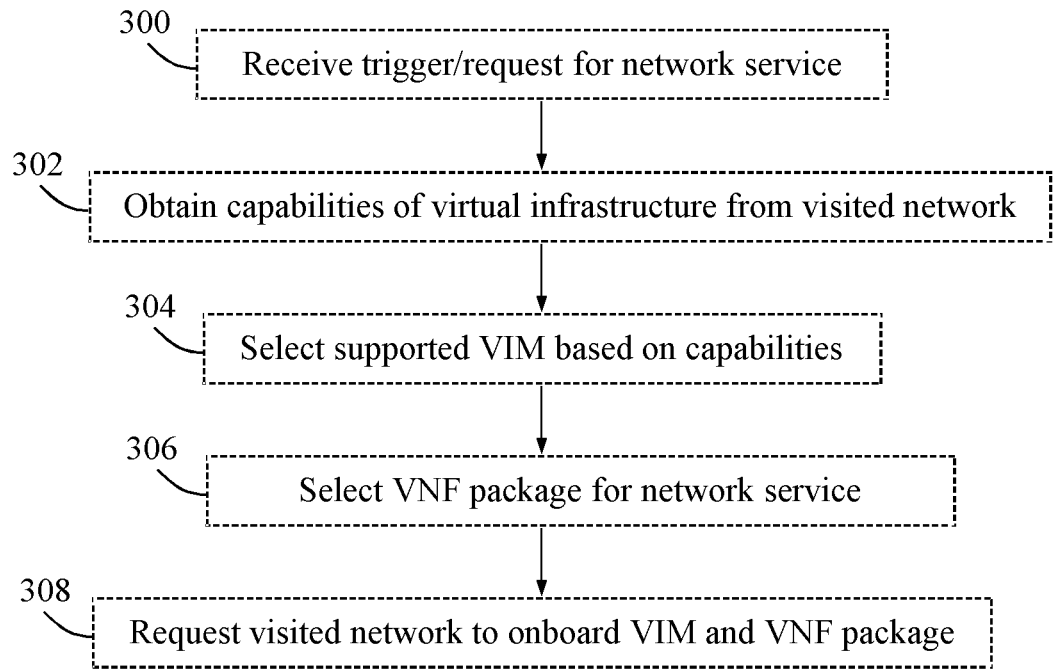
FIGS. 3A and 3B are flow charts illustrating procedures in a home network, according to further example embodiments.
Figure 3B:
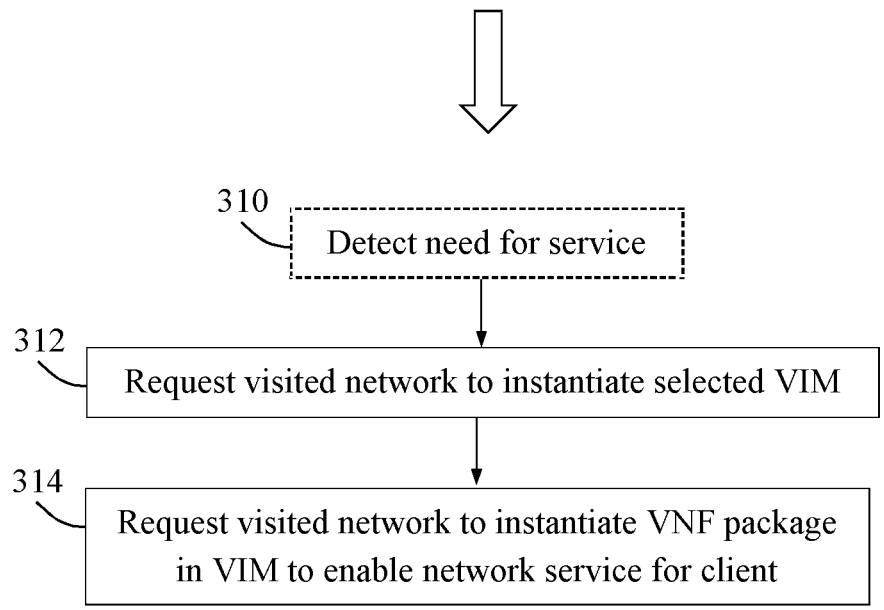

An example of how the solution may be employed in terms of actions performed by a home network system 200 is illustrated by the flow chart in FIG. 3A and by the flow chart in FIG. 3B, which will thus be described with further reference to FIG. 2. An example of how the solution may be employed in terms of actions performed by a visited network system 202 is illustrated by the flow chart in FIG. 4 which will likewise be described below with further reference to FIG. 2.

The home network system 200 comprises a first orchestrator node, denoted $1^{st}$ NFVO, 200A and the visited network system 202 similarly comprises a second orchestrator node, denoted $2^{nd}$ NFVO, 202A, which orchestrator nodes may be employed to perform at least some of the following actions. The home network system 200 may further comprise a broker function 200B in the first orchestrator node 200A and the visited network system 202 may likewise comprise a corresponding broker function 202B in the second orchestrator node 202A, wherein the broker functions 200B, 202B communicate with each other at least in an onboarding operation as described below.

FIGS. 3A-B illustrate a procedure in the home network system 200 for enabling a network service to be employed for the client in a visited network 202 using at least one Virtual Network Function, VNF 202D of a Virtualized Infrastructure 202C in the visited network. Some optional example embodiments that could be used in this procedure will also be described.

Figure 4:
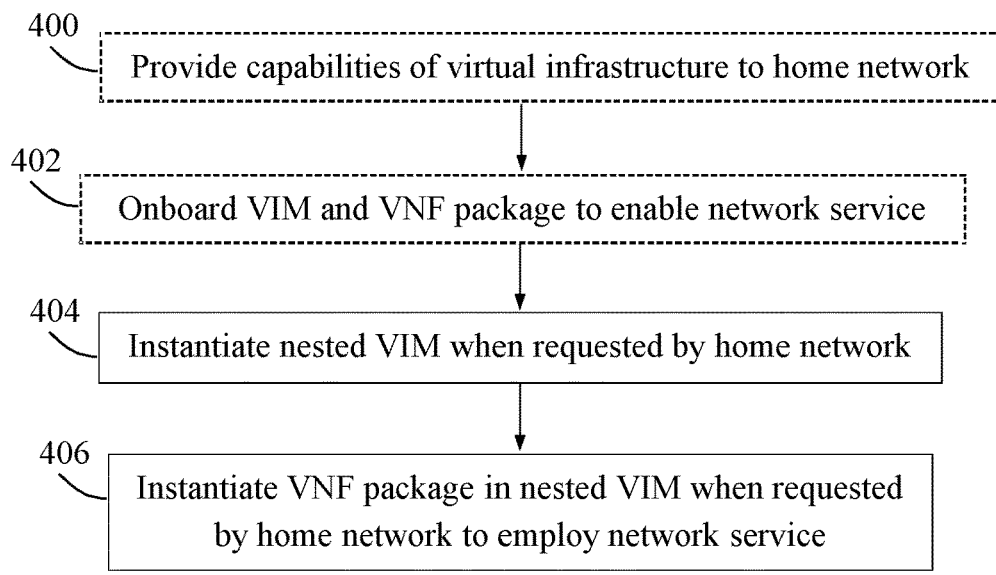
FIG. 4 is a flow chart illustrating a procedure in a visited network, according to further example embodiments.

FIG. 4 illustrates a procedure in the visited network system 202 for enabling a network service to be employed in the visited network for a client belonging to a home network 200, by using at least one Virtual Network Function, VNF 202D of a Virtualized Infrastructure 202C in the visited network. Some optional example embodiments that could be used in this procedure will likewise be described.

A first action 300 in FIG. 3A illustrates that the home network system 200 may receive some trigger for preparing a network service to be provided for a client, as also shown in action 2:1 of FIG. 2. This trigger may occur when receiving a service request or when a contract or the like is established between respective operators of the two networks, e.g. to create federated slicing of virtualized resources to be used by visiting clients.

In another action 302, the home network system 200 may obtain nesting capabilities of the Virtualized Infrastructure in the visited network, said nesting capabilities indicating what types of physical and virtual resources are available in the Virtualized Infrastructure, as also shown in action 2:2 of FIG. 2. A first action 400 in FIG. 4 illustrates that the visited network system 202 provides to the home network system 200 such nesting capabilities of the Virtualized Infrastructure in the visited network, which thus corresponds to actions 2.2 and 302.

In another action 304, the home network system 200 selects a VIM to be instantiated from a set of predefined VIMs supported by the home network based on the obtained nesting capabilities, as also illustrated by an action 2:3 of FIG. 2. The set of predefined and supported VIMs may be maintained by the home network system 200 in a database 200D which can be retrieved in this selecting action.

In a further action 306, the home network system 200 also selects a VNF package that needs to be deployed in the selected VIM to enable the network service, as also shown in action 2:4 of FIG. 2. A number of predefined VNF packages that can be used for providing various network services may likewise be maintained by the home network system 200 in another database 200E which can be retrieved in this selecting action. In this context, the term "VNF package" indicates a set of one or more VNFs needed to provide a service function and may in practice be comprised of one or more individual VNF packages although the singular form VNF package will be used herein for simplicity. A VNF package may be comprised of VNF software images along with associated templates that fully describe the attributes and requirements necessary to realize a VNF as specified in ETSI GS NFV-MAN 001 V1.1.1.

A next action 308 in FIG. 3A illustrates that the home network system 200 requests the visited network to onboard the selected VIM and to onboard the VNF package, as also shown in action 2:5 of FIG. 2. A further action 402 in FIG. 4 illustrates that the visited network system 202 accordingly onboards the selected VIM and then onboards the selected VNF package. These onboarding operations may be performed in response to the onboarding request from the home network system 200 as of actions 2:5 and 308. In more detail, an action 2:6 illustrates that the visited network system 202 onboards the selected VIM by storing software for the VIM in a catalog or the like. Another action 2:7 illustrates that the visited network system 202 onboards the selected VNF package by storing software for the VNF package, e.g. in the same catalog or in another catalog.

Actions 300-308 in the home network system 200 and actions 400-402 in the visited network system 202 may be performed as an onboarding operation which needs to be performed just once and for all, e.g. as a preparation of the network service before any service request has been received. This onboarding operation enables a following instantiation operation to be executed rapidly and efficiently since the VIM and the VNF package with their required software are already in place in the visited network 202. It should be noted that the instantiation operation can be performed multiple times once the nested VIM and the VNF package have been onboarded in the visited network, such as each time when the network service is to be employed for a client.

An instantiation operation is thus illustrated by the remaining actions 310-314 in the home network system 200 and the remaining actions 404-406 in the home network system 200, which will now be described with further reference to the remaining actions 2:8-2:10 in FIG. 2.

In action 310, the home network system 200 may detect a need for employing the network service for a client of the home network when visiting the visited network. In another action 312, the home network system 200 requests the visited network to instantiate a nested VIM 202E which has been onboarded in the visited network and selected from a set of predefined VIMs supported by the home network depending on nesting capabilities of the Virtualized Infrastructure in the visited network, the nested VIM being capable of managing resources in the Virtualized Infrastructure. This action corresponds to an action 2:8 in FIG. 2. It was described above how the VIM was selected based on the nesting capabilities in actions 304 and 2:3, and how the selected VIM was onboarded in actions 308, 402 and 2:5, 2:6.

In another action 314, the home network system 200 requests the visited network to instantiate in the nested VIM a VNF package which has been onboarded in the visited network and having software needed to execute the network service, thereby enabling the network service to be employed using the instantiated VIM and VNF package. This action corresponds to an action 2:9 in FIG. 2. It was likewise described above how the selected VNF package was onboarded in actions 308, 402 and 2:5, 2:7.

In FIG. 4, an action 402 illustrates that the visited network system 202 instantiates, when requested by the home network as of action 312, a nested Virtualized Infrastructure Manager, VIM, 202E which has been onboarded in the visited network and is capable of managing resources in the Virtualized Infrastructure, wherein the nested VIM has been selected from a set of predefined VIMs supported by the home network depending on nesting capabilities of the Virtualized Infrastructure in the visited network.

Another action 404 illustrates that the visited network system 202 instantiates in the nested VIM, when requested by the home network as of action 314, a VNF package which has been onboarded in the visited network and having software needed to execute the network service, thereby enabling the network service to be employed using the instantiated VIM and VNF package. The instantiation of the VIM and VNF package is also shown as an action 2:10 in FIG. 2.

Some optional example embodiments that could be used in the procedure of FIGS. 3A, 3B will now be described.

In one example embodiment, said requesting the visited network to instantiate a nested VIM may be performed by a first orchestrator node 200A of the home network.

In another example embodiment, the first orchestrator node may have selected the VIM to be instantiated from a set of predefined VIMs supported by the home network based on the nesting capabilities of the Virtualized Infrastructure in the visited network, said nesting capabilities indicating what types of physical and virtual resources are available in the Virtualized Infrastructure.

In another example embodiment, the first orchestrator node may have further requested the visited network to onboard the selected VIM and the VNF package, as in actions 308 and 2:5.

In another example embodiment, said requesting to onboard the selected VIM and the VNF package may have been performed proactively prior to any service request from the client.

In another example embodiment, the first orchestrator node may communicate with the visited network by means of a broker function 200B connected to a corresponding broker function 202B in a second orchestrator node 202A of the visited network.

In another example embodiment, said requesting to instantiate a VNF package in the nested VIM may be performed by a VNF Manager 200C of the home network.

In another example embodiment, the above procedure in the home network may be triggered by detecting a need for employing the network service, as of action 300.

In another example embodiment, the instantiated VNF package may comprise one or more VNF images.

In another example embodiment, the instantiated VNF package may include at least one control plane VNF and/or at least one user plane VNF.

In another example embodiment, the above procedure may be performed by communication with the visited network over an Or-Or interface as defined by ETSI.

Some optional example embodiments that could be used in the procedure of FIG. 4 will now also be described.

In one example embodiment, said instantiating a nested VIM may be performed by a second orchestrator node 202A of the visited network.

In another example embodiment, the second orchestrator node has onboarded said nested VIM and VNF package when requested by a first orchestrator node 200A of the home network, as in actions 308, 2:5.

In another example embodiment, the second orchestrator node may communicate with the first orchestrator node by means of a broker function 202B connected to a corresponding broker function 200B in the first orchestrator node.

In another example embodiment, said instantiating a VNF package may be performed by the instantiated VIM.

In another example embodiment, the instantiated VNF package may comprise one or more VNF images.

In another example embodiment, the instantiated VNF package may include at least one control plane VNF and/or at least one user plane VNF.

In another example embodiment, the above procedure in the visited network may be performed by communication with the home network over an Or-Or interface as defined by ETSI.

Figure 5:
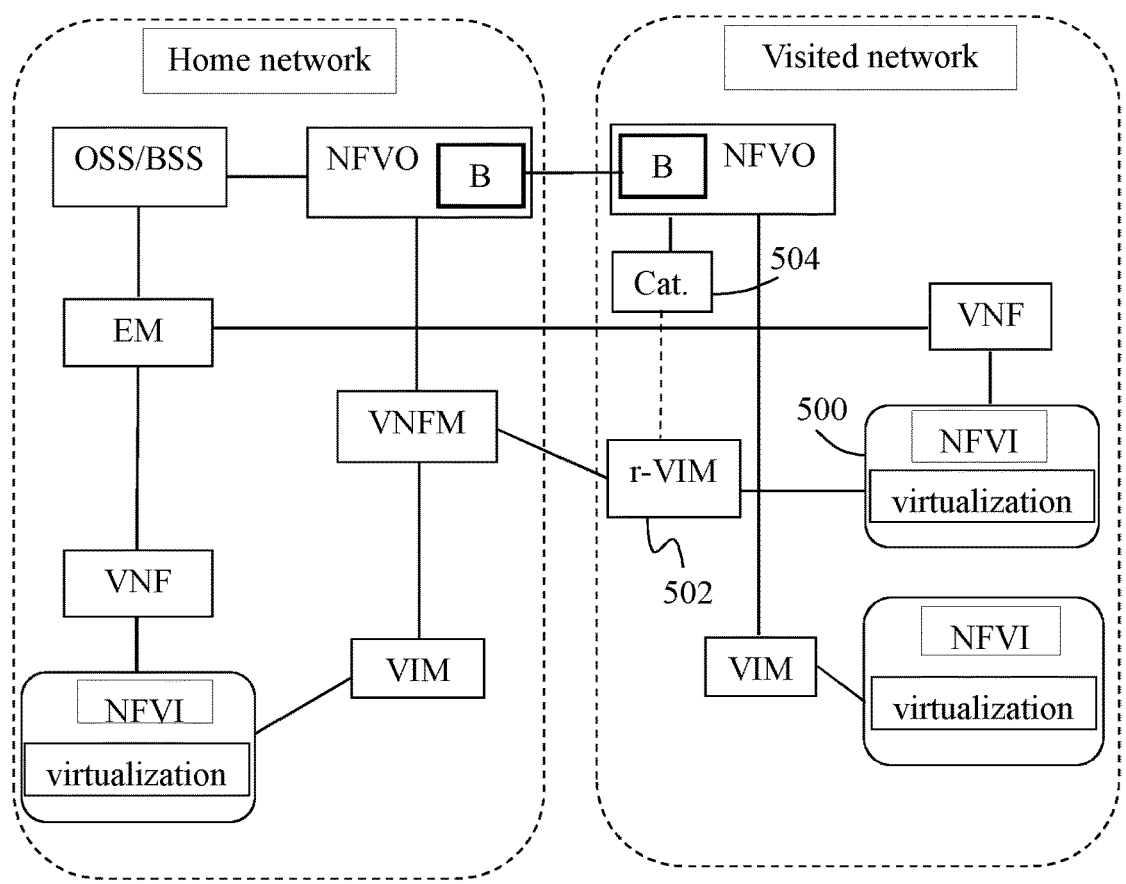
FIG. 5 is a block diagram illustrating how elements in a home network and elements in a visited network may be structured and operative in practice, according to further example embodiments.

An example of how elements in a home network and elements in a visited network may be structured and operative in practice when the procedures herein are employed, is schematically illustrated by the block diagram in FIG. 5 where respective orchestrator nodes in a home network and in a visited network are denoted NFVO and respective broker functions therein are denoted B. It can be seen that the broker functions are connected for communication in the manner described herein, e.g. through an Or-Or interface as defined by ETSI.

The visited network comprises the above-described virtual infrastructure NFVI 500 in which resources can be used to realize a network service in the visited network for a visiting client belonging to the home network. The above-described VIM that is instantiated in the visited network is denoted r-VIM 502 to indicate that it is a remote VIM as seen from the home network. It is also shown that software and a description of the selected VIM can be stored in a catalog denoted "Cat." 504 in the onboarding operation which are used for creating the r-VIM 502 in the instantiating operation.

A more detailed example of how a network service can be prepared for deployment in a visited network by performing the above-described onboarding operation, will now be described with reference to the signaling diagram in FIG. 6, e.g. when the elements in the home and visited networks shown in FIG. 5 are employed.

This example involves a first orchestrator node 600 in the home network, denoted "NFVO home" and a second orchestrator node 602 in the visited network, denoted "NFVO visited". Further, a broker function 600A is operative in the first orchestrator node 600 and a corresponding broker function 602A is operative in the second orchestrator node 602, wherein the broker functions 600A, 602A may communicate with each other to accomplish the above-described onboarding operation by executing the following actions as follows. Although it can be efficient to let such broker functions take care of the onboarding operation, it is also possible that this communication might be conducted directly between the first and second orchestrator nodes 600, 602. Further, reference will sometimes also be made to elements shown in FIG. 5.

Action 6:1

The broker function 600A in the home network sends a discovery message to the broker function 602A in the visited network for discovering nesting capabilities of a Virtualized Infrastructure in the visited network. Before this action, the first orchestrator node 600 may request the broker function 600A to execute the onboarding of a VIM and a VNF package to enable a network service.

Action 6:2

The broker function 602A in the visited network replies to the broker function 600A in the home network with a list of nesting capabilities which may e.g. include, without limitation, processor type and deployed hypervisor. Thereby, the Infrastructure capabilities in the visited network are known to the home network.

Action 6:3

The broker function 600A in the home network matches the received nesting capabilities over its list of predefined and familiar VIMs and selects one VIM to be used and accessed from the home network as a remote VIM, denoted r-VIM once it has been instantiated, such as the r-VIM 502 in FIG. 5.

Action 6:4

The broker function 600A in the home network requests the broker function 602A in the visited network to onboard the selected VIM.

Action 6:5

The broker function 602A in the visited network accordingly onboards the VIM in the second orchestrator node 602 of the visited network, which is basically achieved by storing software that is needed to create, run and control the r-VIM and any functions therein. e.g. The r-VIM software may be stored in the catalog 504 of FIG. 5.

Action 6:6

The broker function 602A in the visited network sends an acknowledgement to the broker function 600A in the home network when onboarding of the VIM has been completed.

Action 6:7

The broker function 600A in the home network further selects the VNF package, e.g. comprising various VNFs and/or VNF images, that needs to be deployed in the visited network for realizing the network service.

Action 6:8

The broker function 600A in the home network requests the broker function 602A in the visited network to onboard the VNFs of the selected VNF package which may be delivered in encrypted form.

Action 6:9

The broker function 602A in the visited network accordingly onboards the VNFs of the VNF package by storing them e.g. in the catalog 504 of FIG. 5, possibly in encrypted form.

Action 6:10

The broker function 602A in the visited network sends an acknowledgement to the broker function 600A in the home network when onboarding of the VNFs has been completed.

Action 6:11

The broker function 600A in the home network notifies the NFVO home 600 that the network service has now been onboarded in the visited network.

Figure 6:
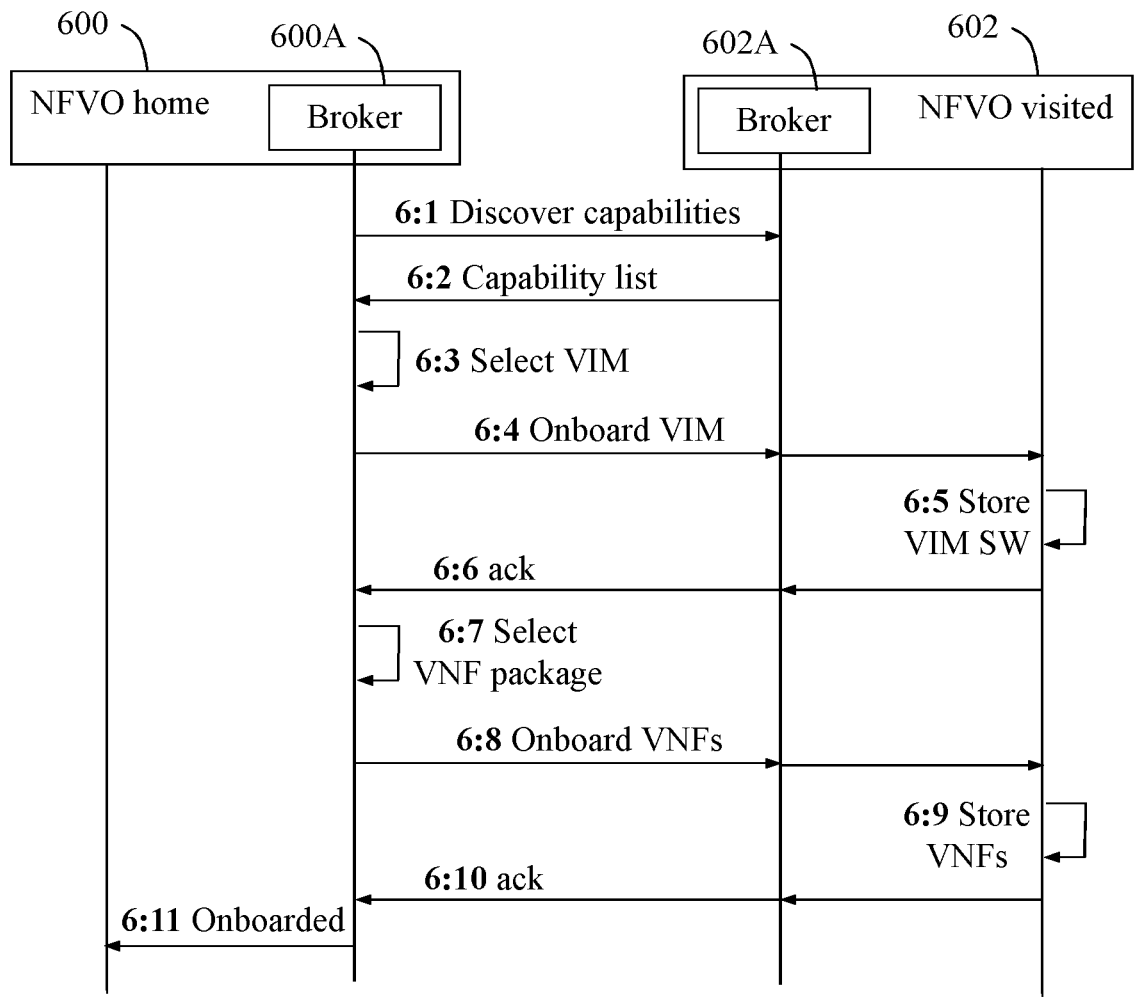
FIG. 6 is a signaling diagram illustrating an example of how a network service can be prepared in a visited network in practice, according to further example embodiments.

The communication illustrated in FIG. 6 may be conducted by means of extensions to the Or-Or interface as currently defined by ETSI. Such extensions could include information elements that describe the nesting capabilities of a VIM, including but not limited to:

Virtualization Technology (VT-d) instruction extensions in a physical processor.

Advanced Programmable Interrupt Controller (APIC) virtualization instructions in the processor exposed as software configuration option in a hypervisor.

Kernel Same-Page Merging capability in a kernel of an operating system, as exposed to the hypervisor.

Huge Pages configuration parameter for the kernel of the operating system, including whether it is enabled and the maximum size supported.

Single Root Input/Output Virtualization (SR-IOV) capabilities for network adapters.

Input-Output Memory Management Unit (IOMMU) capabilities in the network interface drivers loaded in the operating system.

Furthermore, such extensions could include information elements associated to a new procedure that allows onboarding a VIM, which is different than onboarding a VNF in the sense that requirements for nesting capabilities to be offered by the hosting VIM need to be specified in line with the example above.

Having executed the above actions of FIG. 6, the network service is now ready to be employed for a client of the home network when visiting the visited network, e.g. as described below.

A more detailed example of how the network service that was prepared and onboarded according to FIG. 6 can be employed by the client in the visited network by basically performing the above-described instantiating operation, will now be described with reference to the signaling diagram in FIG. 7. In the instantiating operation, the broker functions 600A, 602A are not needed and they are therefore omitted in FIG. 7.

Figure 7:
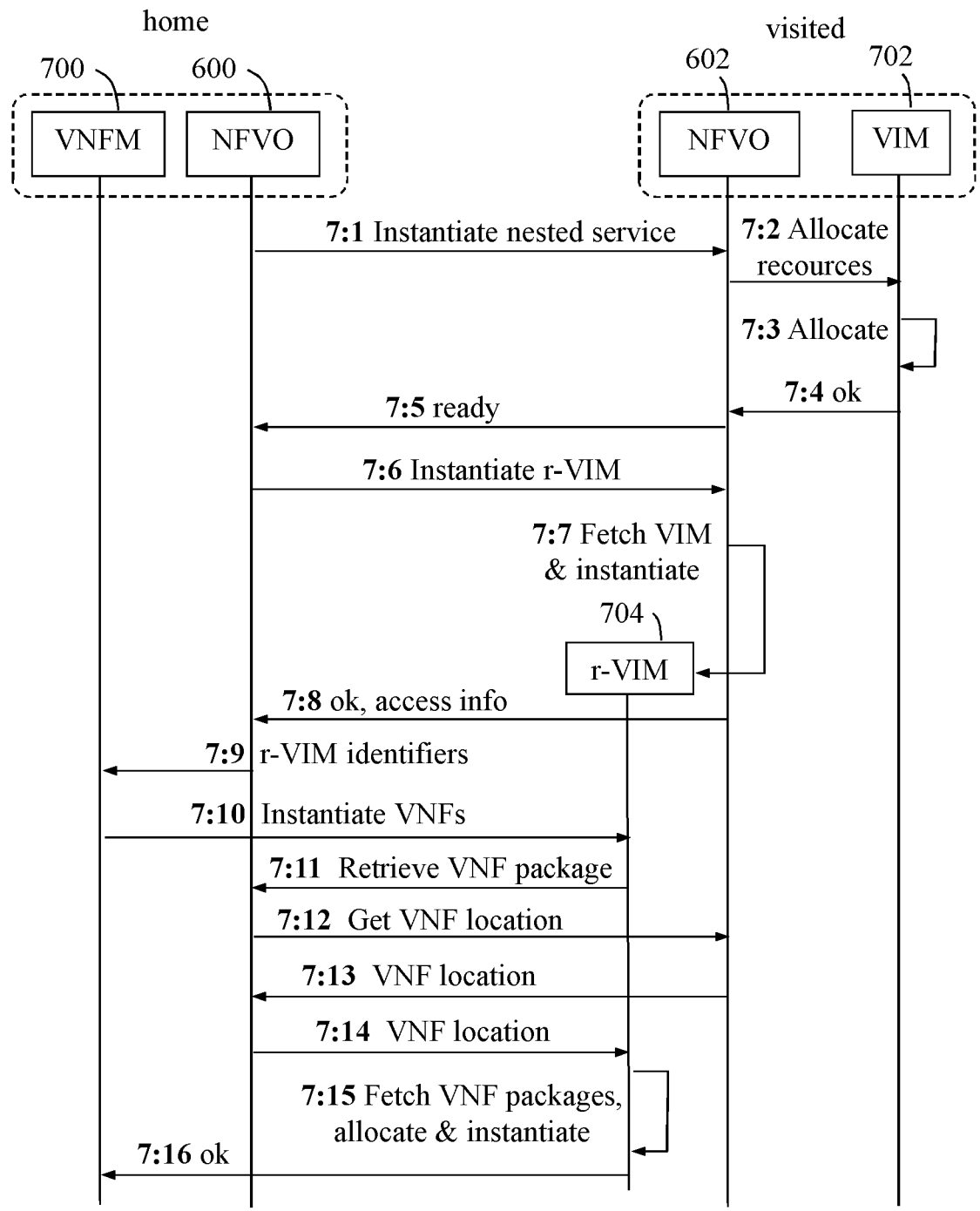
FIG. 7 is another signaling diagram illustrating an example of how the network service prepared in FIG. 6 can be employed in the visited network in practice, according to further example embodiments.

Some time may pass after the onboarding operation of FIG. 6 before the instantiating operation of FIG. 7 is commenced. In some cases however, the first action 7:1 in FIG. 7 may follow immediately timewise after the final action 6:11 in FIG. 7, thus possibly preempting the need for using the network service, while in other cases action 7:1 could be triggered at a later stage e.g. after signaling from a home network client roaming to the visited network would indicate the need for such deployment. The procedure in FIG. 7 involves the first orchestrator node 600 in the home network, and the second orchestrator node 602 in the visited network, the orchestrator nodes 600, 602 being denoted NFVO, and further a VNFM 700 in the home network and an existing VIM 702 in the visited network.

Action 7:1

The first orchestrator node 600 requests the second orchestrator node 602 to instantiate the previously onboarded network service, e.g. using an IFA028 NS instantiate message extended with information regarding the VIM that needs to be instantiated, i.e. the VIM 704 that was onboarded in action 6:5. From a visited network perspective, the VIM 704 can be regarded as just another VNF that needs to be deployed before the other VNFs in this NS could be deployed. The NS may need to include descriptors for Virtual Private Network (VPN) tunnels that can be used to interconnect the VNFM 700 that will request instantiation of the VNF package e.g. including a control plane VNF (cpVNF) and/or a user plane VNF (upVNF).

The above request for instantiation of the network service may be sent to the broker function 602A in the visited network, not shown in this figure, which then may, after checking that the requested VIM is still available in the PO domain, relay the NS Instantiate message to the second orchestrator node 602.

Action 7:2

The second orchestrator node 602 requests the VIM 702 to allocate resources Action 7:3 needed to fulfill the request for instantiation of the network service received from the first orchestrator node 600.

Action 7:4

The VIM 702 sends an acknowledgement of the resource allocation and tunnel establishment over PO resources to the second orchestrator node 602.

Action 7:5

The second orchestrator node 602 signals to the first orchestrator node 600 to indicate that the required resources have been provisioned in the visited network.

Action 7:6

The first orchestrator node 600 requests the second orchestrator node 602 to instantiate the VIM which have been onboarded in the above action 6:5, to become the r-VIM 704.

Action 7:7

The second orchestrator node 602 fetches the software of the r-VIM, e.g. from catalog 504, and accordingly instantiates the r-VIM 704, basically by loading the fetched software into a processor.

Action 7:8

The second orchestrator node 602 sends an acknowledgement to the first orchestrator node 600 to indicate that instantiation of the r-VIM 704 is complete. A timeline for the r-VIM 704 starts from now, and information needed to access the r-VIM 704, such as an IP address, is also communicated to the first orchestrator node 600.

Action 7:9

The first orchestrator node 600 sends details on how to access the r-VIM 704 to the VNFM 700.

Action 7:10

The VNFM 700 then requests instantiation within the r-VIM 704 of the VNFs that were onboarded in the above action 6:9.

Action 7:11

The r-VIM 704 queries the first orchestrator node 600 for the VNF package with the required VNFs.

Action 7:12

The first orchestrator node 600 queries the second orchestrator node 602 for the location of the VNF package(s), i.e. requesting the location from where the VNF package can be retrieved.

Action 7:13

The second orchestrator node 602 responds with a message containing a network address such as a URL where the VNF package could be accessed locally by the r-VIM 704. This may further speed up the instantiation for the case it is done in response to a client request.

Action 7:14

The first orchestrator node 600 sends the received location of the VNF package(s) to the r-VIM 704.

Action 7:15

The r-VIM 704 fetches the VNF packages and instantiates the VNFs.

Action 7:16

Finally, the r-VIM 704 informs the VNFM 700 that the instantiation of the VNFs has been completed.

Thereby, the VNFM 700 can start and control the network service by suitable communication with the r-VIM 704 and the VNFs therein. The instantiated VNF allows for the client to access the network service in the visited network. The VNFM may perform lifecycle operations other than instantiation on the VNF instance, basically in cooperation with the r-VIM, as specified in ETSI GS NFV-MAN 001 V1.1.1.

Figure 8:
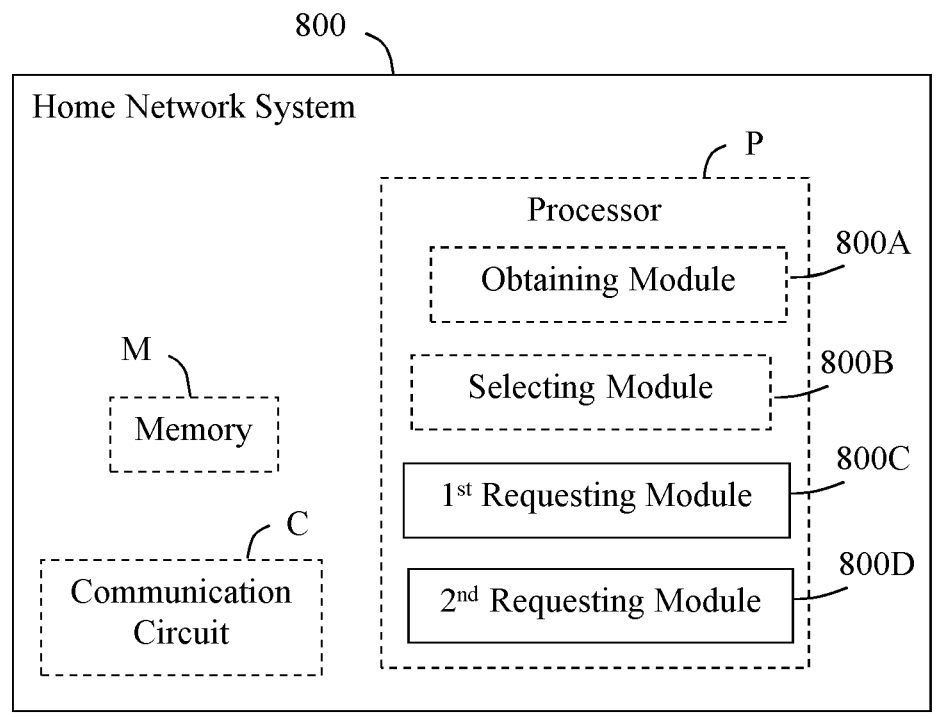
FIG. 8 is a block diagram illustrating how a home network system and a visited network system may be structured, according to further example embodiments.
Figure 8:
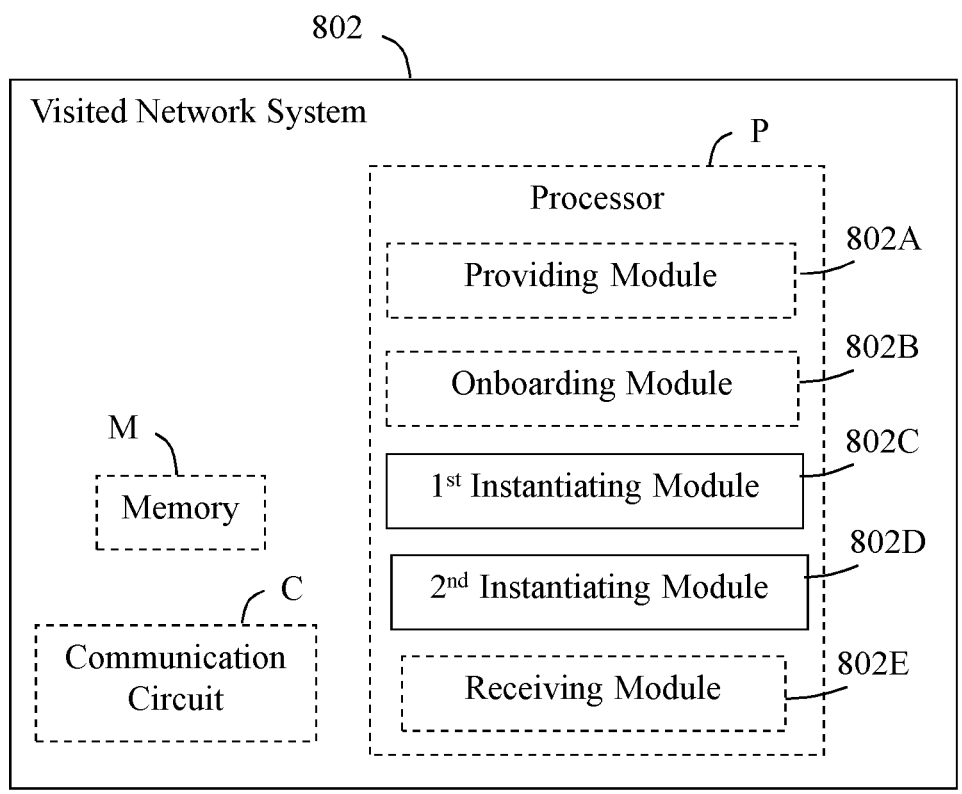

The block diagram in FIG. 8 illustrates a detailed but non-limiting example of how a home network system 800 and a visited network system 802, respectively, may be structured to bring about the above-described solution and embodiments thereof. In this figure, the home network system 800 and the visited network system 802 may be configured to operate according to any of the examples and embodiments of employing the solution as described herein, where appropriate. Each of the home network system 800 and the visited network system 802 is schematically shown to comprise a processor "P", a memory "M" and a communication circuit "C" with suitable equipment for transmitting and receiving messages and information in the manner described herein.

Figure 1:
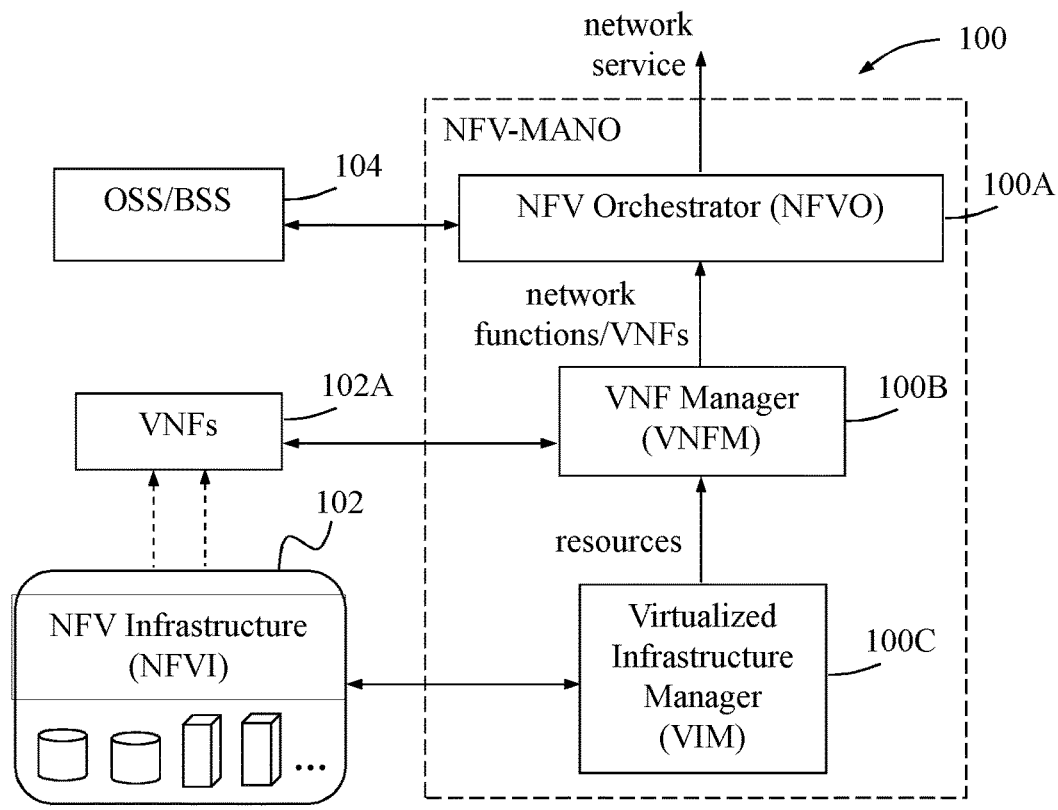
FIG. 1 is a block diagram illustrating how Network Function Virtualization, NFV, can be employed to enable network services, according to the prior art.

It should be noted however that this figure only illustrates how the respective systems comprise a processor with different modules to carry out the functions and operations described herein, and that the illustrated communication circuits, memories, processors and modules can in different arrangements be distributed to more than one node, e.g. including any of an orchestrator node or NFVO, a VNF manager or VNFM and a VIM, which is subject to practical implementation. For example, each system 800, 802 may have an NFVO, one or more VNFMs and one or more VIMs, as shown in FIG. 1 although not shown in FIG. 8.

The communication circuit C in each of the home network system 800 and the visited network system 802 thus comprises equipment configured for communication between the systems 800, 802 using suitable messages and protocols for the communication depending on the implementation. The solution is however not limited to any specific types of messages and protocols.

The home network system 800 is, e.g. by means of units, modules or the like, configured or arranged to perform at least some of the actions of the flow chart in FIG. 3B for requesting the above-described instantiations when the network service is to be employed, and optionally also the actions of the flow chart in FIG. 3A for requesting the above-described onboardings in preparation of employment of the network service. Further, the visited network system 802 is, e.g. by means of units, modules or the like, configured or arranged to perform at least some of the actions of the flow chart in FIG. 4.

The home network system 800 is arranged to enable a network service to be employed for the client in a visited network 802 using at least one Virtual Network Function, VNF of a Virtualized Infrastructure in the visited network.

The home network system 800 may be configured to obtain nesting capabilities of the Virtualized Infrastructure in the visited network, e.g. as in actions 6:1 and 6:2 above, said nesting capabilities indicating what types of physical and virtual resources are available in the Virtualized Infrastructure. This obtaining operation may be performed by an obtaining module 800A in the home network system 800, as also shown in action 302.

The home network system 800 may also be configured to select the VIM to be instantiated from a set of predefined VIMs supported by the home network based on the obtained nesting capabilities, e.g. as in action 6:3 above. This selecting operation may be performed by a selecting module 800B in the home network system 800, as also shown in action 304. As explained above, obtaining nesting capabilities and selecting a VIM based on the nesting capabilities and the following onboarding activities may be performed just once and for all, e.g. as a preparation before any service request has been received. In contrast thereto, the instantiating operations can be performed multiple times once the nested VIM and the VNF package have been onboarded in the visited network, such as each time when the network service is to be employed for a client.

The home network system 800 is configured to request the visited network to instantiate a nested Virtualized Infrastructure Manager, VIM, which has been onboarded in the visited network and selected from a set of predefined VIMs supported by the home network depending on nesting capabilities of the Virtualized Infrastructure in the visited network, the nested VIM being capable of managing resources in the Virtualized Infrastructure. This requesting operation may be performed by a first requesting module 800C in the home network system 800, as shown in action 312. The first requesting module 800C may also have requested the visited network to onboard the selected VIM in the visited network at some point prior to the aforementioned VIM instantiation request, as also indicated in action 308.

The home network system 800 is further configured to request the visited network to instantiate in the nested VIM a VNF package which has been onboarded in the visited network and having software needed to execute the network service, thereby enabling the network service to be employed using the instantiated VIM and VNF package. This further requesting operation may be performed by a second requesting module 800D in the home network system 800, as shown in action 314. The requesting modules 800C, 800D could alternatively be named sending modules. The second requesting module 800D may also have requested the visited network to onboard the VNF package in the selected VIM at some point prior to the aforementioned VNF package instantiation request, as likewise indicated in action 308.

The visited network system 802 is arranged to enable a network service to be employed in the visited network for a client belonging to a home network 800, by using at least one Virtual Network Function, VNF of a Virtualized Infrastructure in the visited network.

The visited network system 802 may be configured to provide nesting capabilities of the Virtualized Infrastructure in the visited network to the home network system 800, e.g. in the form of a capability list as in action 6:2 above, said nesting capabilities indicating what types of physical and virtual resources are available in the Virtualized Infrastructure. This providing operation may be performed by a providing module 802A in the visited network system 802, as also shown in action 400.

The visited network system 802 may also be configured to onboard the selected VIM and to onboard the VNF package in the onboarded VIM, as in the above actions 6:5 and 6:9, respectively. These onboarding operations may be performed by an onboarding module 802B in the visited network system 802, as indicated in action 402, e.g. in response to an onboarding request from the home network system 800 as of action 308.

The visited network system 802 is configured to instantiate, when requested by the home network (as of action 312), a nested Virtualized Infrastructure Manager, VIM, which has been onboarded in the visited network and is capable of managing resources in the Virtualized Infrastructure, wherein the nested VIM has been selected from a set of predefined VIMs supported by the home network depending on nesting capabilities of the Virtualized Infrastructure in the visited network. This instantiating operation may be performed by a first instantiating module 802C in the visited network system 802 as shown in action 404.

The visited network system 802 is also configured to instantiate in the nested VIM, when requested by the home network (as of action 314), a VNF package which has been onboarded in the visited network and having software needed to execute the network service, thereby enabling the network service to be employed using the instantiated VIM and VNF package. This further instantiating operation may be performed by a second instantiating module 802D in the visited network system 802, as shown in action 406.

The visited network system 802 may further comprise a receiving module 802E which is configured to receive the above-described onboarding and instantiating requests from the home network system 800, e.g. as shown in actions 6:4 and 6:8, respectively.

It should be noted that FIG. 8 illustrates various functional modules in the home network system 800 and the visited network system 802, respectively, and the skilled person is able to implement these functional modules in practice using suitable software and hardware equipment. Thus, the solution is generally not limited to the shown structures of the home network system 800 and the visited network system 802, and the functional modules therein may be configured to operate according to any of the features, examples and embodiments described in this disclosure, where appropriate.

The functional modules 800A-D and 802A-E described above may be implemented in the home network system 800 and the visited network system 802, respectively, by means of program modules of a respective computer program comprising code means which, when run by the processor P causes the home network system 800 and the visited network system 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the home network system 800 and the visited network system 802 in the form of a memory having a computer readable medium and being connected to the processor P. The computer program product or memory M in each of the home network system 800 and the visited network system 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective home network system 800 and visited network system 802.

The solution described herein may be implemented in each of the home network system 800 and the visited network system 802 by a computer program comprising instructions which, when executed on at least one processor, cause the at least one processor to carry out the actions according to any of the above embodiments and examples, where appropriate. The solution may also be implemented at each of the home network system 800 and the visited network system 802 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "home network", "visited network", "orchestrator node", "Virtualized Infrastructure", "Virtual Network Function, VNF", "NFV Orchestrator, NFVO", "Virtualized Infrastructure Manager, VIM", "Virtual Network Function Manager, VNFM", "nesting capabilities", "VNF package", "VNF image" and "broker function" have been used throughout this disclosure, although any other corresponding entities, functions, and/or parameters could also be used having the features and characteristics described here. The solution is defined by the appended claims.

The invention claimed is:

1. A method in a home network of a client, for enabling a network service to be employed for the client in a visited network using at least one virtual network function (VNF) of a virtualized infrastructure in the visited network, the method comprising:
   requesting the visited network to instantiate a nested virtualized infrastructure manager (VIM) which has been onboarded in the visited network and selected from a set of predefined VIMs supported by the home network depending on nesting capabilities of the VI in the visited network, the nested VIM being capable of managing resources in the VI; and
   requesting the visited network to instantiate in the nested VIM a VNF package which has been onboarded in the visited network and having software needed to execute the network service, thereby enabling the network service to be employed using the instantiated VIM and VNF package.

2. The method of claim 1, wherein said requesting the visited network to instantiate a nested VIM is performed by a first orchestrator node of the home network.

3. The method of claim 2, wherein the first orchestrator node has selected the VIM to be instantiated from a set of predefined VIMs supported by the home network based on the nesting capabilities of the VI in the visited network, said nesting capabilities indicating what types of physical and virtual resources are available in the VI.

4. The method of claim 3, wherein the first orchestrator node has further requested the visited network to onboard the selected VIM and the VNF package.

5. The method of claim 4, wherein said requesting to onboard the selected VIM and the VNF package has been performed proactively prior to any service request from the client.

6. The method of claim 4, wherein the first orchestrator node communicates with the visited network by means of a broker function connected to a corresponding broker function in a second orchestrator node of the visited network.

7. The method of claim 1, wherein said requesting to instantiate a VNF package in the nested VIM is performed by a VNF Manager of the home network.

8. The method of claim 1, wherein the method is triggered by detecting a need for employing the network service.

9. The method of claim 1, wherein the instantiated VNF package comprises one or more VNF images.

10. The method of claim 1, wherein the instantiated VNF package includes at least one control plane VNF and/or at least one user plane VNF.

11. The method of claim 1, wherein the method is performed by communication with the visited network over an Or-Or interface as defined by ETSI.

12. A computer program product comprising a non-transitory computer readable medium storing a computer program comprising instructions which, when executed on at least one processor, cause the at least one processor to carry out the method of claim 1.

13. A home network system of a client, arranged to enabling a network service to be employed for the client in a visited network using at least one virtual network function (VNF) of a virtualized infrastructure in the visited network, the home network system comprising:
   memory; and
   processing circuitry coupled to the memory, wherein the home network system is configured to:
   request the visited network to instantiate a nested virtualized infrastructure manager (VIM), which has been onboarded in the visited network and selected from a set of predefined VIMs supported by the home network depending on nesting capabilities of the VI in the visited network, the nested VIM being capable of managing resources in the VI; and
   request the visited network to instantiate in the nested VIM a VNF package which has been onboarded in the visited network and having software needed to execute the network service, thereby enabling the network service to be employed using the instantiated VIM and VNF package.

14. A computer program product comprising a non-transitory computer readable medium storing a computer program comprising instructions which, when executed on at least one processor, cause the at least one processor to carry out the method of claim 13.

15. A method in a visited network for enabling a network service to be employed in the visited network for a client belonging to a home network, by using at least one virtual network function (VNF) of a virtualized infrastructure (VI) in the visited network, the method comprising:
- instantiating, when requested by the home network, a nested virtualized infrastructure manager (VIM) which has been onboarded in the visited network and is capable of managing resources in the VI, wherein the nested VIM has been selected from a set of predefined VIMs supported by the home network depending on nesting capabilities of the VI in the visited network, and
- instantiating in the nested VIM, when requested by the home network, a VNF package which has been onboarded in the visited network and having software needed to execute the network service, thereby enabling the network service to be employed using the instantiated VIM and VNF package.

16. The method of claim 15, wherein said instantiating a nested VIM is performed by a second orchestrator node of the visited network.

17. The method of claim 16, wherein the second orchestrator node has onboarded said nested VIM and VNF package when requested (308, 2:5) by a first orchestrator node of the home network.

18. The method of claim 16, wherein the second orchestrator node communicates with the first orchestrator node by means of a broker function connected to a corresponding broker function in the first orchestrator node.

19. The method of claim 15, wherein said instantiating a VNF package is performed by the instantiated VIM.

20. The method of claim 15, wherein the instantiated VNF package comprises one or more VNF images.

21. The method of claim 15, wherein the instantiated VNF package includes at least one control plane VNF and/or at least one user plane VNF.

22. The method of claim 15, wherein the method is performed by communication with the home network over an Or-Or interface as defined by ETSI.

23. A visited network system arranged to enable a network service to be employed in the visited network for a client belonging to a home network, by using at least one virtual network function (VNF) of a virtualized infrastructure in the visited network, the visited network system comprising:
- memory; and
- processing circuitry coupled to the memory, wherein the visited network system is configured to:
- instantiate, when requested by the home network, a nested virtualized infrastructure manager (VIM) which has been onboarded in the visited network and is capable of managing resources in the VI, wherein the nested VIM has been selected from a set of predefined VIMs supported by the home network depending on nesting capabilities of the VI in the visited network, and
- instantiate in the nested VIM, when requested by the home network, a VNF package which has been onboarded in the visited network and having software needed to execute the network service, thereby enabling the network service to be employed using the instantiated VIM and VNF package.

* * * * *